United States Patent
Cummiskey et al.

(10) Patent No.: US 10,066,139 B2
(45) Date of Patent: Sep. 4, 2018

(54) COMPOSITION COMPRISING SATURATED HYDROCARBON AND METHOD FOR DUST SUPPRESSION

(71) Applicant: AMERICAN REFINING GROUP, INC., West Conshohocken, PA (US)

(72) Inventors: Helen M. Cummiskey, Bradford, PA (US); Andrew M. Burgoon, Bradford, PA (US); Heather J. Kuntz, Bradford, PA (US); Michael J. Kozminski, Lewis Run, PA (US)

(73) Assignee: American Refining Group, Inc., West Conshohocken, PA (US)

( * ) Notice: Subject to any disclaimer, the term of this patent is extended or adjusted under 35 U.S.C. 154(b) by 924 days.

(21) Appl. No.: 14/383,314

(22) PCT Filed: Sep. 2, 2014

(86) PCT No.: PCT/US2014/053719
§ 371 (c)(1),
(2) Date: Sep. 5, 2014

(87) PCT Pub. No.: WO2016/036350
PCT Pub. Date: Mar. 10, 2016

(65) Prior Publication Data
US 2016/0060498 A1 Mar. 3, 2016

(51) Int. Cl.
*C09K 3/22* (2006.01)
*E01C 21/00* (2006.01)
*E01C 23/00* (2006.01)
*E21F 5/00* (2006.01)

(52) U.S. Cl.
CPC . *C09K 3/22* (2013.01); *E21F 5/00* (2013.01)

(58) Field of Classification Search
CPC ................................ C09K 3/22; E21F 5/00
See application file for complete search history.

(56) References Cited

U.S. PATENT DOCUMENTS

| 4,946,970 A | 8/1990 | Green et al. |
| 6,811,721 B1 | 11/2004 | Taylor et al. |
| 2005/0124527 A1 | 6/2005 | Hawkins et al. |
| 2012/0184787 A1* | 7/2012 | Miller .................... C10G 45/64 585/1 |
| 2013/0140486 A1 | 6/2013 | Vitale et al. |
| 2015/0119301 A1 | 4/2015 | McDaniel et al. |

FOREIGN PATENT DOCUMENTS

WO  2007-103398 A1  9/2007

OTHER PUBLICATIONS

International Search Report and Written Opinion issued in connection with corresponding International Application No. PCT/US2014/053719, dated May 12, 2015, 14 pages.

* cited by examiner

*Primary Examiner* — Colin W. Slifka
(74) *Attorney, Agent, or Firm* — Duane Morris LLP (57) ABSTRACT

A composition for suppressing dust particles includes from about 51% to about 100% by weight of saturated hydrocarbons, and from about 0 to about 49% by weight of unsaturated hydrocarbons. The composition has a content of wax in the range from about 5% to about 40% by weight of the total composition. A method of making and a method of using such a composition are also provided.

26 Claims, 6 Drawing Sheets

COMPOSITION COMPRISING SATURATED HYDROCARBON AND METHOD FOR DUST SUPPRESSION

FIELD

The disclosure relates to hydrocarbon based compositions and their use. More particularly, the disclosed subject matter relates to a composition comprising hydrocarbon, a method of making such a composition, a method for using such a composition for suppressing dust, and a system for dust suppression.

BACKGROUND

The problems of fugitive dust are well known and encountered in the constructions industries, the coal industry, and other mining industries. Fugitive dust even exists in agriculture and food processing industries. Dust and other solid particles can also be suspended in air and pose environmental issues in populated or environmentally sensitive areas. Such particles also pose detrimental health effects.

One example, hydraulic fracturing, known as "fracking" or "hydrofracking" in the oil and gas industry, is the propagation of fractures in a rock layer to enhance the release of oil and natural gas into the well bore for extraction and subsequent refining. In hydraulic fracturing, a proppant is used at a large amount to keep the fractures in the rock open. Hundreds of tons of proppant are used for fracturing a well. The proppant often contains silica such as silica sand, or resin coated silica sand. When the proppant is processed, large amounts of dust containing silica and other components are evolved. The silica dust is created during the movement of the proppant by shearing of the sand particles as they slide along one another. In addition to potential contamination of the air and water nearby, the silica dust also exposes workers at the well site, at the mines and at the processing facilities to possible inhalation. Such an exposure can lead to a lung disease called silicosis.

Silicosis is a form of an occupational lung disease caused by inhalation of crystallized silica dust. It is characterized by inflammation and scarring in forms of nodular lesions in the upper lobes of the lungs. When small silica dust particles are inhaled (<10 μm) they can imbed themselves in the air exchange portion of workers' lungs (alveoli). The lungs cannot clear themselves of the imbedded dust by mucous or coughing, thus chronic exposure to respirable silica can cause a buildup of these particles and lead to silicosis.

Conventional dust suppression systems include both mechanical and chemical methods. Dust collection equipment includes devices which capture entrained dust, induce the dust to settle, or contain the dust. The most common method, however, is the wetting of dust particles (such as coal) with water. Water is inexpensive and large quantities can be applied. However, its effectiveness as a dust suppressant is less than satisfactory. The addition of water may cause additional problems such as a decrease in the specific heating value of coal. Other aqueous additives such as surfactants or foaming agents, and aqueous compositions comprising asphalt emulsions or other organic coating materials are also used to suppress dust. In addition to aqueous solutions, oils and resins are also used to reduce or eliminate coal dust. Oil spraying includes the use of crude, residual, waste or fuel oils. Synthetic and natural polymers can be coated onto coal to reduce dust. However, the prior additives and compositions have limited applicability and effectiveness.

SUMMARY OF THE INVENTION

The present invention provides a composition for suppressing dust particles, the method of making and the method of using such a composition.

In some embodiments, the composition for suppressing dust particles comprises saturated hydrocarbons and unsaturated hydrocarbons. For example, the composition comprises from about 51% to about 100% by weight of saturated hydrocarbons (e.g., paraffin and cyclic saturated hydrocarbons), and from about 0 to about 49% by weight of unsaturated hydrocarbons (e.g., aromatic hydrocarbons). The composition has a content of wax, which can be a part of the saturated and the unsaturated hydrocarbons, in the range from about 5% to about 40% by weight of the total composition.

In some embodiments, the saturated hydrocarbons and the unsaturated hydrocarbons are hydrocarbons in the range of from C6 to C61. In some embodiments, the saturated hydrocarbons comprise hydrocarbons substantially in the range of from C16 to C26. In some embodiments, the saturated hydrocarbons can comprise paraffin in the range of from about 61% to about 99.9% by weight of the total composition. The unsaturated hydrocarbons are in the range of from about 5% to about 30% (e.g., from about 10% to about 20%) by weight of the total composition.

The wax may be paraffinic wax. The wax may also be saturated hydrocarbon in the range from C27 to C61. The content of the wax can be in the range from about 5% to about 30% (e.g., 10-20%) by weight of the total composition. In some embodiments, the wax has a boiling point of equal to or higher than 376° C. measured under atmospheric pressure. For example, the saturated hydrocarbons and the unsaturated hydrocarbons may have a boiling point in the range from about 285° C. to about 405° C., and from about 60% to about 95% by weight of total composition has a boiling point of in the range of from 285° C. to 376° C. The boiling points are all measured under atmospheric pressure. In some embodiments, the composition as dust suppressant has a melting point of in the range of from 0° C. to 37.7° C.

In some embodiments, the saturated hydrocarbons further comprise at least one cyclic saturated hydrocarbon, which is in the range from about 0.1% to about 10% by weight of the total composition.

In some embodiments, the present disclosure provides an exemplary composition. In such an exemplary composition, the saturated hydrocarbons are in the range of from about 80% to about 95% by weight of the total composition. The wax is a portion of the saturated hydrocarbons and is in the range from about 10% to about 20% by weight of the total composition. The unsaturated hydrocarbons are aromatic hydrocarbons, and are in the range of from about 5 to about 20% by weight of the total composition.

In another aspect, the present disclosure provides a method of making the composition for suppressing dust particles described herein. The method of making the composition comprises fractionally distilling a fraction from a crude oil. The fraction comprises saturated and unsaturated hydrocarbons in the range of from C6 to C61.

Such a method further comprises hydrogenating (also known as hydrotreating process) the fraction to convert at least a portion of the unsaturated hydrocarbons to saturated hydrocarbons. In some embodiments, the unsaturated hydrocarbons in the fraction comprise aromatic hydrocarbons, and at least a portion of the aromatic hydrocarbons is converted into cyclic saturated hydrocarbons after the step of hydrogenating. Sometimes the unsaturated hydrocarbons in the fraction may comprise olefin (e.g., <5 wt. % or <2 wt. %). The olefin is converted into saturated hydrocarbon after the step of hydrogenating. The degree of the hydrogenation in the step of hydrogenating is in the range from 10% to 95% by weight (e.g., 10%-75% or 20%-40%) of the unsaturated hydrocarbons in the fractions.

In another aspect, the present disclosure provides a method of using the composition for suppressing particles described herein. The method of using the composition comprises applying the composition to bring the composition in contact with the particles. The step of applying the composition may comprise a step of mixing the composition with the particles, or a step of spraying the composition onto with the particles, or any combinations thereof. In some embodiments, the composition is sprayed into drops having a size substantially similar or close to (or the same as) the size of the particles. The method of using can further comprise heating the composition before or during the step of applying the composition, at a temperature of in the range from 10° C. to 100° C. (e.g., from 37° C. to 70° C. or from 20 to 25° C.).

In another aspect, a system for making the composition or using the composition described herein are also provided.

BRIEF DESCRIPTION OF THE DRAWINGS

The present disclosure is best understood from the following detailed description when read in conjunction with the accompanying drawings. It is emphasized that, according to common practice, the various features of the drawings are not necessarily to scale. On the contrary, the dimensions of the various features are arbitrarily expanded or reduced for clarity. Like reference numerals denote like features throughout specification and drawings.

DETAILED DESCRIPTION

This description of the exemplary embodiments is intended to be read in connection with the accompanying drawings, which are to be considered part of the entire written description. In the description, relative terms such as "lower," "upper," "horizontal," "vertical,", "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description and do not require that the apparatus be constructed or operated in a particular orientation. Terms concerning attachments, coupling and the like, such as "connected," refer to a relationship wherein structures are secured or attached to one another either directly or indirectly through intervening structures, as well as both movable or rigid attachments or relationships, unless expressly described otherwise.

For purposes of the description hereinafter, it is to be understood that the embodiments described below may assume alternative variations and embodiments. It is also to be understood that the specific articles, compositions, and/or processes described herein are exemplary and should not be considered as limiting.

The hydrocarbons in crude oil are mostly alkanes, cycloalkanes and various aromatic hydrocarbons while the other organic compounds contain nitrogen, oxygen and sulfur, and trace amounts of metals such as iron, nickel, copper and vanadium. The exact molecular composition varies but the general compositions include about 15 wt. %-60 wt. % of paraffins (average about 30%), about 30 wt. % to 60 wt. % of naphthenes (average 49%), and about 3 wt. % to 30 wt. % of aromatics (average 15%). The remainder is asphaltic (average 6%). The crude oil can be then fractured into different fractions based on the range of the boiling points.

Starting from distilled fractions of crude oils, the inventors have invented a novel composition which can be directly used to effectively suppress fugitive dust and other particles with high efficiency. Such a composition can be used to suppress a variety of different particles in versatile applications, including but are not limited to constructions industries, the coal industry, other mining industries, agriculture and food processing industries. These particles include but are not limited to silica, sand, concrete, soil, flour, airborne biohazard particles, and any other particles which may be suspended in the air. The present invention also provides the method of making and the method of using such a composition for suppressing dust particles.

In some embodiments, the composition for suppressing dust particles comprises saturated hydrocarbons and unsaturated hydrocarbons. For example, the composition comprises from about 51 wt. % to about 100 wt. % of saturated hydrocarbons, and from about 0 (or about 0.1%) to about 49 wt. % of unsaturated hydrocarbons. Unless expressly indicated otherwise, the content of an ingredient is characterized by a weight percentage in the total composition. The saturated hydrocarbons may include paraffin and cyclic saturated hydrocarbons. The unsaturated hydrocarbons may be aromatic hydrocarbons. The composition also has a certain amount of wax. The wax can be a part of the saturated and the unsaturated hydrocarbons, or just a part of the saturated hydrocarbons. In some embodiments, the content of the wax is in the range from about 5 wt. % to about 40 wt. % of the total composition.

In some embodiments, the saturated hydrocarbons and the unsaturated hydrocarbons have a narrow distribution based on carbon atoms in each molecule. For example, the saturated hydrocarbons and the unsaturated hydrocarbons are hydrocarbons in the range of from C6 to C61. In some embodiments, the saturated hydrocarbons are substantially in the range of from C16 to C26. In some embodiments, the saturated hydrocarbons can comprise paraffin in the range of from about 61 wt. % to about 99.9% wt. % of the total composition. The unsaturated hydrocarbons are in the range of from about 5 wt. % to about 30 wt. % (e.g., from about 10 wt. % to about 20 wt. %) of the total composition.

The wax may be paraffinic wax. The wax may also be saturated hydrocarbon in the range from C27 to C61 (e.g., from C27 to C50, or from C27 to C40). The content of the wax can be in the range from about 5% to about 30% (e.g., 10-20%) by weight of the total composition. In some embodiments, the wax has a boiling point of equal to or higher than 376° C. measured under atmospheric pressure. In another word, a portion of the fraction of hydrocarbons having a boiling point of equal to or higher than 376° C. can be used as an approximate indication of the content of the wax. Unless expressly indicated otherwise, the boiling points in the present disclosure are measured under atmospheric pressure.

In some embodiments, the saturated hydrocarbons and the unsaturated hydrocarbons may have a boiling point in the range from about 285° C. to about 405° C., and from about 60% to about 95% by weight of total composition has a boiling point of in the range of from 285° C. to 376° C. In some embodiments, the composition as dust suppressant has a melting point of in the range of from 0° C. to 37.7° C.

In some embodiments, the saturated hydrocarbons further comprise at least one cyclic saturated hydrocarbon, which may be at any amount in the total composition. For example, the content of the cyclic saturated hydrocarbon is in the range from about 0.1% to about 10% by weight of the total composition. The cyclic saturated hydrocarbons may be provided through hydrogenation of aromatic hydrocarbons in a distilled fraction of a crude oil.

As an example, in such an exemplary composition, the saturated hydrocarbons are in the range of from about 80 wt. % to about 95 wt. %. The wax is a portion of the saturated hydrocarbons such as paraffins and is in the range from about 10 wt. % to about 20 wt. % of the total composition. The unsaturated hydrocarbons are aromatic hydrocarbons, and are in the range of from about 5 wt. % to about 20 wt. % of the total composition.

To make the composition for suppressing dust particles described herein, a crude oil can be fractionally distilled to provide an initial fraction. Such an initial fraction may have chemical composition close to that of the composition of dust suppressant described above, except that the initial fraction may have a small amount of olefin (e.g., 1-5% or <2%), and a content of aromatic hydrocarbon higher than that in the composition of dust suppressant. In some embodiments, the initial fraction comprises saturated and unsaturated hydrocarbons in the range of from C6 to C61, for example, substantially in the range of from C16 to C26. The initial fraction may also comprise wax at an amount similar to or lower than that of the composition described above. The boiling points of the initial fraction may be also in a range similar to (or slightly lower than) that of the composition described above.

The initial fraction can be then hydrogenated. The hydrogenating is used to convert at least a portion of the unsaturated hydrocarbons to saturated hydrocarbons. In some embodiments, the unsaturated hydrocarbons in the fraction comprise aromatic hydrocarbons, and at least a portion of the aromatic hydrocarbons is converted into cyclic saturated hydrocarbons after the step of hydrogenating. Sometimes the unsaturated hydrocarbons in the fraction may comprise olefin (e.g., <5 wt. % or <2 wt. %). The olefin is substantially converted into saturated hydrocarbon after the step of hydrogenating. The degree of the hydrogenation in the step of hydrogenating is in the range from 10% to 95% by weight (e.g., 10%-75% or 20%-40%) of the unsaturated hydrocarbons in the fractions.

The hydrogenation may be performed using hydrogen and a catalyst (e.g., Ni, Mo) under a certain temperature (e.g., 300-380° C.) and a certain pressure (e.g., 600-1000 psi). For example, the initial fraction can be hydrogenated with pure hydrogen gas at a temperature in the range of from 315° C. to 345° C. under a pressure in the range from 700 psi to 900 psi. The wax in the initial fraction is not removed before and after the hydrogenation.

The chemical compositions and physical properties of both the initial fraction and the final composition as dust suppressant are characterized using the standard methods, mostly following the ASTM standards.

The term "API gravity," as used herein, refers to the American Petroleum Institute gravity of a petroleum liquid expressed as degrees API and determined in accordance with ASTM standard D 287 entitled Standard Method of Test for API Gravity of Crude Petroleum and Petroleum Products (Hydrometer Method). The API gravity is an inverse measure of the relative density of petroleum liquid and the density of water.

The term "flash point," as used herein, refers to the lowest temperature at which it can vaporize to form an ignitable mixture in air. The flash point of all petroleum products with flash points above 79° C. (175° F.) and below 400° C. (752° F.) except fuel oils can be measured following ASTM Standard D92 entitled Standard Test Method for Flash and Fire Points by Cleveland Open Cup.

The term "aniline point" of an oil, as used herein, refers to the minimum temperature at which equal volumes of aniline and the oil are miscible, i.e. form a single phase upon mixing. A lower aniline point is an indication of higher content of aromatic compound in the oil. Aniline point is measured following the ASTM Standard D611 entitled Standard Test Methods for Aniline Point and Mixed Aniline Point of Petroleum Products and Hydrocarbon Solvents.

The term "viscosity index" (VI), as used herein, refer to the rate of change of viscosity of lubricating oil with temperature. An oil having a high viscosity index (e.g., above 80) exhibits a smaller change in viscosity with temperature variation than those with a low viscosity index (e.g., lower than 35).

Compositions of saturated and unsaturated hydrocarbon, polar compounds, olefin and other ingredients are measured following the ASTM standard D2007 entitled Standard Test Method for Characteristic Groups in Rubber Extender and Processing Oils and Other Petroleum-Derived Oils by the Clay-Gel Absorption Chromatographic Method. This test method covers a procedure for classifying oil samples of into the hydrocarbon types of polar compounds, aromatics and saturates, and recovery of representative fractions of these types based on boiling points.

The distillation tables showing content of ingredients in each boiling point interval are generated following the ASTM standard D2887.

The examples described below are just for illustration purpose.

Figure 1:
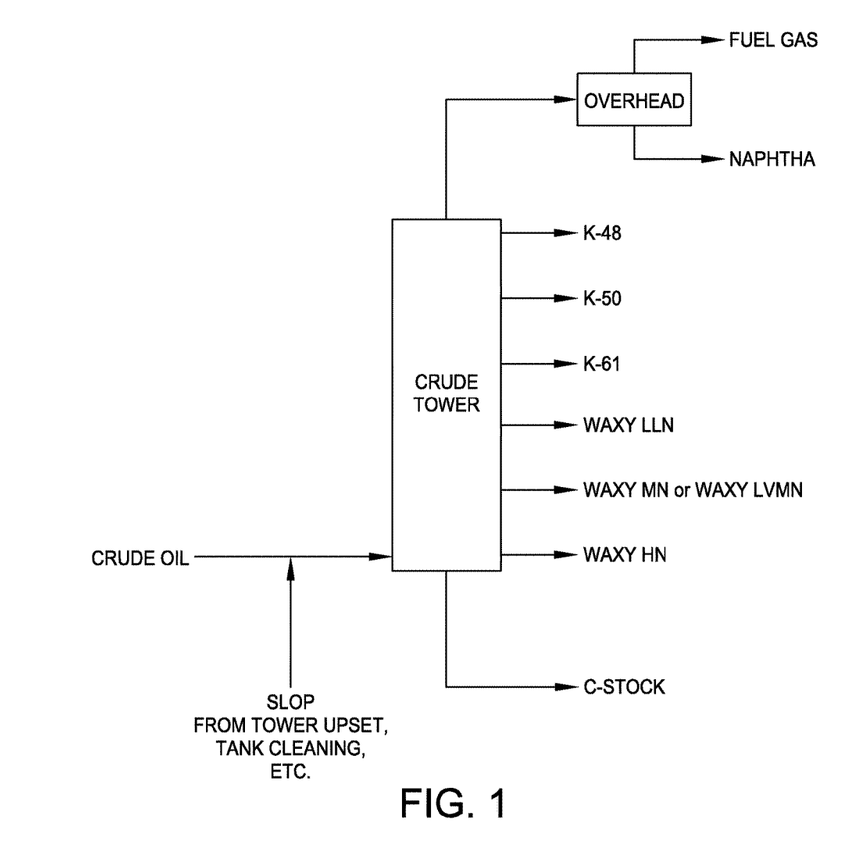
FIG. 1 illustrates a crude tower for separating hydrocarbons through fractional distillation in accordance with some embodiments.

Referring to FIG. 1, different grades of hydrocarbons can be fractionated from crude oil through fractional distillation in a crude tower in accordance with some embodiments. In some embodiments, the crude oil is preheated with fractionated products and then further heated in the furnace to 715 F (380° C.) before injecting into the bottom of the crude tower. In some embodiments, the fractional distillation is performed under atmosphere pressure. As shown in FIG. 1, the atmospheric distillation process fractionates a crude oil (e.g., Pennsylvania Grade crude oil) into eight liquid streams and one fuel gas stream. These fractionated grades or streams include fuel gas, heavy naphtha, K-48, K-50, K-61, Waxy LLN (light lube neutral), Waxy MN (medium neutral), Waxy HN (heavy neutral), and C-stock (cylinder stock) in the order of increasing boiling points.

Figure 2:
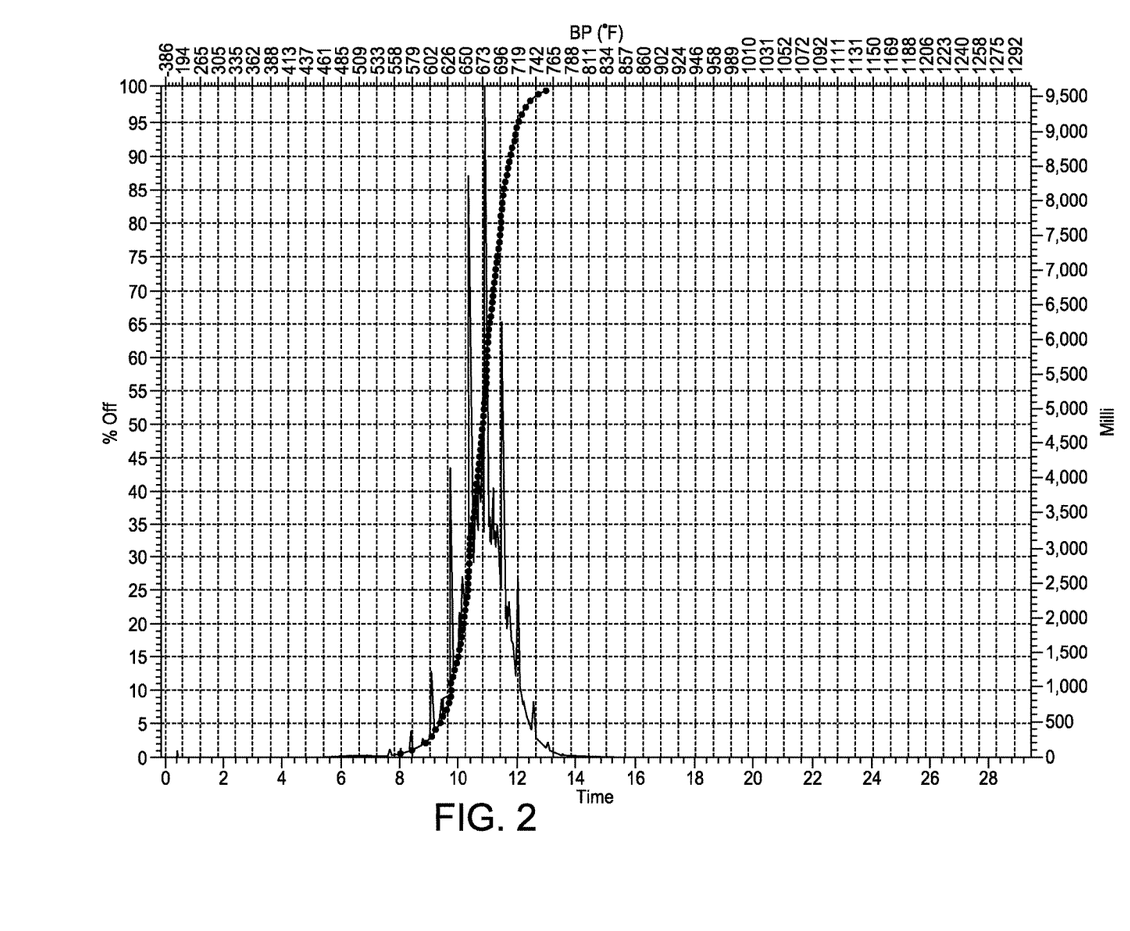
FIG. 2 is the distillation chart of an exemplary hydrocarbon fraction waxy LLN used in some embodiments.

The inventors have identified the fraction of Waxy LLN as a suitable initial fraction to make the composition for suppressing dust particles in some embodiments. Referring to FIG. 2 (distillation chart), and Tables 1-2, Waxy LLN has about 83.0% of saturated hydrocarbons, about 15.9% of aromatic hydrocarbons, and about 1.1% olefins. The wax content is about 16% (in the range of 15-17%). The wax content was separated and measured at a temperature in the range from −27.8° C. to −26.1° C. in this disclosure. The saturated hydrocarbons and the unsaturated hydrocarbons are hydrocarbons in the range of from C6 to C61, predominantly in the range of from C16 to C26. Referring to the distillation table shown in FIG. 2 and Table 2, the ingredients of Waxy LLN have a boiling point in the range of from 300 to 400° C. The boiling point of the peak composition (which is about 50% of the total composition in the distillation chart) is about 356° C. Based on the measured wax content (about 16%), the portion having a boiling point above 376° C. can be used to roughly correlate with the wax content in the composition in some embodiments (see Table 2).

The contents of impurities are negligible in Waxy LLN. For example, Waxy LLN has a nitrogen content of 1 ppm measured following ASTM standard D-5762, and a carbon residue of less than 0.1 wt. % measured following ASTM standard D-4530. The content of iron is 1.5 ppm by weight. The contents of other metals such as vanadium, nickel, copper and sodium are less than 0.1 ppm by weight. The bromine number measured according to ASTM D-1159 is 3.4 g/100 gm. The total content of chlorides is less than 1 ppm by weight. The content of silicon measured following ASTM standard D-5184 is 0.2 ppm by weight. The content of hydrogen sulfide in the liquid is less than 10 ppm by weight.

TABLE 1

Chemical Compositions and Physical Properties of Waxy LLN Before Hydrogenation

| Property | Results |
| --- | --- |
| Viscosity at 40° C. (centipoise) | 8.73 |
| Viscosity at 100° C. (centipoise) | 2.45 |
| Viscosity Index | 102 |
| ASTM color | 3.0 |
| Flash point (° C.) | 182.2 |
| Solid point (° C.) | 13.0 |
| Moisture (ppm, Karl Fisher) | 35 |
| Sulfur (ppm) | 717 |
| Saturates (wt. %) | 83.0 |
| Aromatics (wt. %) | 15.9 |
| Polar compound (including olefins, wt. %) | 1.1 |
| Wax (wt. %) | 15-17 |
| API Gravity at 15.6° C. | 36.7 |
| Pour Point (° C.) | 15 |
| Aniline Point (° C.) | 198.6 |

TABLE 2

Cumulative Fraction Percentage of Waxy LLN at Different Boiling Point Intervals

| Cumulative Fractions Wt. % | Boiling Point (° F.) | Boiling Point (° C.) |
| --- | --- | --- |
| 0 | 562 | 294.4 |
| 1 | 576 | 302.2 |
| 2 | 593 | 311.7 |
| 3 | 601 | 316.1 |
| 4 | 607 | 319.4 |
| 5 | 613 | 322.8 |
| 6 | 617 | 325.0 |
| 7 | 621 | 327.2 |
| 8 | 625 | 329.4 |
| 9 | 627 | 330.6 |
| 10 | 628 | 331.1 |
| 11 | 628 | 331.1 |
| 12 | 630 | 332.2 |
| 13 | 632 | 333.3 |
| 14 | 635 | 335.0 |
| 15 | 637 | 336.1 |
| 16 | 639 | 337.2 |
| 17 | 640 | 337.8 |
| 18 | 642 | 338.9 |
| 19 | 643 | 339.4 |
| 20 | 645 | 340.6 |
| 21 | 646 | 341.1 |
| 22 | 648 | 342.2 |
| 23 | 649 | 342.8 |
| 24 | 650 | 343.3 |
| 25 | 651 | 343.9 |
| 26 | 652 | 344.4 |
| 27 | 652 | 344.4 |
| 28 | 653 | 345.0 |
| 29 | 653 | 345.0 |
| 30 | 654 | 345.6 |
| 31 | 654 | 345.6 |
| 32 | 655 | 346.1 |
| 33 | 656 | 346.7 |
| 34 | 657 | 347.2 |
| 35 | 658 | 347.8 |
| 36 | 659 | 348.3 |
| 37 | 660 | 348.9 |
| 38 | 661 | 349.4 |
| 39 | 662 | 350.0 |
| 40 | 663 | 350.6 |
| 41 | 664 | 351.1 |
| 42 | 665 | 351.7 |
| 43 | 666 | 352.2 |
| 44 | 667 | 352.8 |
| 45 | 668 | 353.3 |
| 46 | 668 | 353.3 |
| 47 | 669 | 353.9 |
| 48 | 670 | 354.4 |
| 49 | 671 | 355.0 |
| 50 | 672 | 355.6 |
| 51 | 673 | 356.1 |
| 52 | 674 | 356.7 |
| 53 | 675 | 357.2 |
| 54 | 675 | 357.2 |
| 55 | 676 | 357.8 |
| 56 | 676 | 357.8 |
| 57 | 676 | 357.8 |
| 58 | 677 | 358.3 |
| 59 | 677 | 358.3 |
| 60 | 677 | 358.3 |
| 61 | 678 | 358.9 |
| 62 | 679 | 359.4 |
| 63 | 680 | 360.0 |
| 64 | 681 | 360.6 |
| 65 | 682 | 361.1 |
| 66 | 683 | 361.7 |
| 67 | 684 | 362.2 |
| 68 | 68 | 20.0 |
| 69 | 686 | 363.3 |
| 70 | 687 | 363.9 |
| 71 | 688 | 364.4 |
| 72 | 689 | 365.0 |
| 73 | 690 | 365.6 |
| 74 | 691 | 366.1 |
| 75 | 692 | 366.7 |
| 76 | 693 | 367.2 |

TABLE 2-continued

Cumulative Fraction Percentage of Waxy LLN at Different Boiling Point Intervals

| Cumulative Fractions Wt. % | Boiling Point (° F.) | Boiling Point (° C.) |
|---|---|---|
| 77 | 694 | 367.8 |
| 78 | 695 | 368.3 |
| 79 | 696 | 368.9 |
| 80 | 697 | 369.4 |
| 81 | 697 | 369.4 |
| 82 | 698 | 370.0 |
| 83 | 699 | 370.6 |
| 84 | 700 | 371.1 |
| 85 | 701 | 371.7 |
| 86 | 703 | 372.8 |
| 87 | 704 | 373.3 |
| 88 | 706 | 374.4 |
| 89 | 708 | 375.6 |
| 90 | 710 | 376.7 |
| 91 | 712 | 377.8 |
| 92 | 714 | 378.9 |
| 93 | 716 | 380.0 |
| 94 | 718 | 381.1 |
| 95 | 720 | 382.2 |
| 96 | 724 | 384.4 |
| 97 | 729 | 387.2 |
| 98 | 736 | 391.1 |
| 99 | 746 | 396.7 |
| 100 | 756 | 402.2 |

Figure 3:
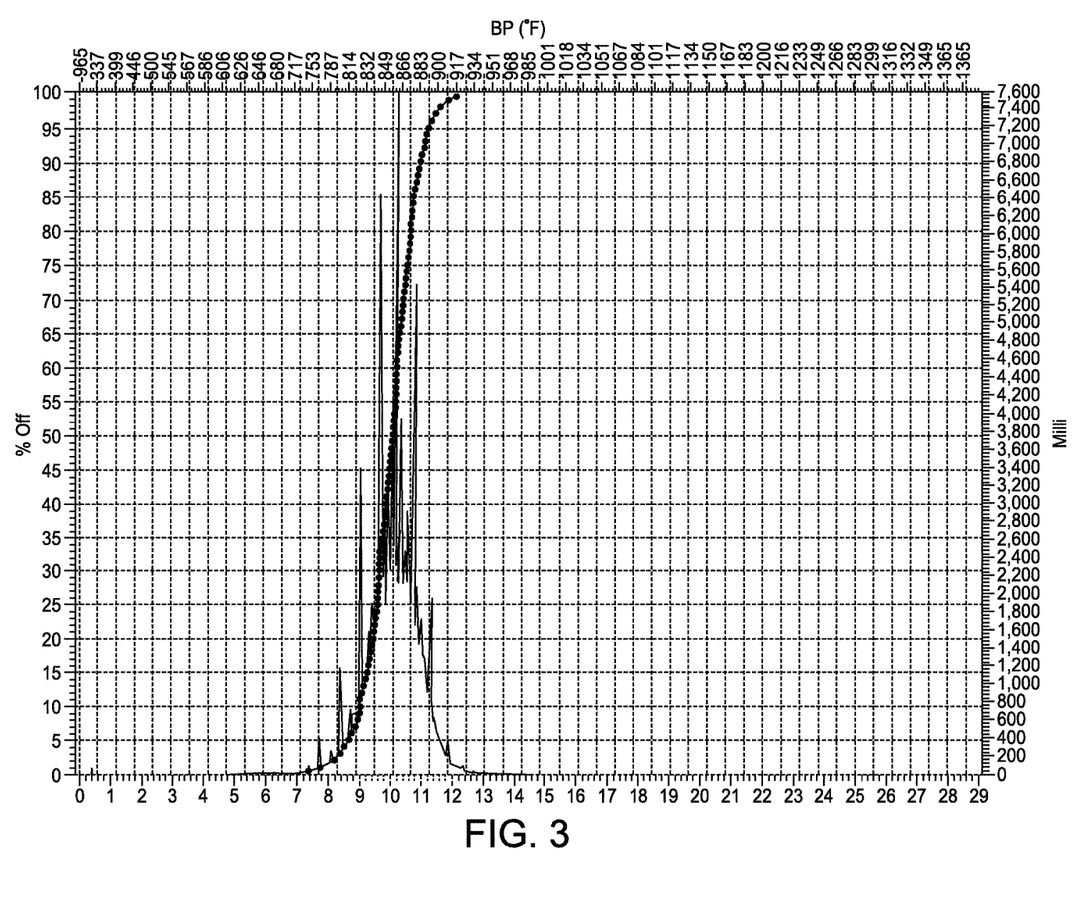
FIG. 3 is the distillation chart of hydrogenated waxy LLN as an exemplary dust suppressant composition in some embodiments.

Waxy LLN is hydrogenated as described. The chemical compositions and physical properties of hydrogenated Waxy LLN are shown in FIG. 3, and Tables 3-4. Hydrogenated Waxy LLN has about 87.95% of saturated hydrocarbons. The olefins (1.1%) in Waxy LLN is converted into saturated hydrocarbon (i.e. paraffin). In addition to 83% of the original saturated hydrocarbons, the content of paraffins is about 84.1%. Hydrogenated Waxy LLN comprises about 3.85% of cyclic hydrocarbons, which are converted from aromatic hydrocarbons. The degree of hydrogenation is about 24%. About 12.05% of aromatic hydrocarbons are still present after hydrogenation. The content of polar compound and olefin in hydrogenated Waxy LLN is approximately zero. The hydrogenated composition has a melting point of less than 37.7° F. The boiling point is in the range from 285° C. to 405° C. The wax content in Table 3 was separated and measured at a temperature in the range from −27.8° C. to −26.1° C.

TABLE 3

Chemical Compositions and Physical Properties of Hydrogenated Waxy LLN

| Property | Results |
|---|---|
| Viscosity at 40° C. (centipoise) | 8.08 |
| Viscosity at 100° C. (centipoise) | 2.34 |
| Viscosity Index | 104 |
| ASTM color | <0.5 |
| Saybolt color | 10.0 |
| Flash point (° C.) | 185 |
| Solid point (° C.) | 14.0 |
| Moisture (ppm, Karl Fisher) | 19.8 |
| Sulfur (ppm) | 50.5 |
| Saturates (wt. %) | 87.95 |
| Aromatics (wt. %) | 12.05 |
| Polar compound (including olefins, wt. %) | 0 |
| Wax (wt. %) | 15-17 |
| API Gravity at 15.6° C. | 37.3 |

TABLE 4

Cumulative Fraction Percentage of Hydrogenated Waxy LLN at Different Boiling Point Intervals

| Cumulative Fractions Wt. % | Boiling Point (° F.) | Boiling Point (° C.) |
|---|---|---|
| 0 | 544 | 284.4 |
| 1 | 560 | 293.3 |
| 2 | 575 | 301.7 |
| 3 | 588 | 308.9 |
| 4 | 596 | 313.3 |
| 5 | 599 | 315.0 |
| 6 | 604 | 317.8 |
| 7 | 609 | 320.6 |
| 8 | 612 | 322.2 |
| 9 | 615 | 323.9 |
| 10 | 619 | 326.1 |
| 11 | 622 | 327.8 |
| 12 | 623 | 328.3 |
| 13 | 624 | 328.9 |
| 14 | 625 | 329.4 |
| 15 | 626 | 330.0 |
| 16 | 628 | 331.1 |
| 17 | 631 | 332.8 |
| 18 | 633 | 333.9 |
| 19 | 635 | 335.0 |
| 20 | 636 | 335.6 |
| 21 | 638 | 336.7 |
| 22 | 639 | 337.2 |
| 23 | 641 | 338.3 |
| 24 | 642 | 338.9 |
| 25 | 644 | 340.0 |
| 26 | 646 | 341.1 |
| 27 | 647 | 341.7 |
| 28 | 648 | 342.2 |
| 29 | 649 | 342.8 |
| 30 | 650 | 343.3 |
| 31 | 650 | 343.3 |
| 32 | 651 | 343.9 |
| 33 | 651 | 343.9 |
| 34 | 652 | 344.4 |
| 35 | 653 | 345.0 |
| 36 | 655 | 346.1 |
| 37 | 656 | 346.7 |
| 38 | 658 | 347.8 |
| 39 | 659 | 348.3 |
| 40 | 660 | 348.9 |
| 41 | 661 | 349.4 |
| 42 | 662 | 350.0 |
| 43 | 663 | 350.6 |
| 44 | 664 | 351.1 |
| 45 | 666 | 352.2 |
| 46 | 667 | 352.8 |
| 47 | 668 | 353.3 |
| 48 | 669 | 353.9 |
| 49 | 671 | 355.0 |
| 50 | 672 | 355.6 |
| 51 | 672 | 355.6 |
| 52 | 673 | 356.1 |
| 53 | 673 | 356.1 |
| 54 | 674 | 356.7 |
| 55 | 674 | 356.7 |
| 56 | 675 | 357.2 |
| 57 | 676 | 357.8 |
| 58 | 677 | 358.3 |
| 59 | 679 | 359.4 |
| 60 | 680 | 360.0 |
| 61 | 681 | 360.6 |
| 62 | 682 | 361.1 |
| 63 | 683 | 361.7 |
| 64 | 685 | 362.8 |
| 65 | 686 | 363.3 |
| 66 | 687 | 363.9 |
| 67 | 688 | 364.4 |
| 68 | 689 | 365.0 |
| 69 | 691 | 366.1 |
| 70 | 692 | 366.7 |
| 71 | 693 | 367.2 |
| 72 | 694 | 367.8 |

TABLE 4-continued

Cumulative Fraction Percentage of Hydrogenated Waxy LLN at Different Boiling Point Intervals

| Cumulative Fractions Wt. % | Boiling Point (° F.) | Boiling Point (° C.) |
|---|---|---|
| 73 | 695 | 368.3 |
| 74 | 695 | 368.3 |
| 75 | 696 | 368.9 |
| 76 | 697 | 369.4 |
| 77 | 698 | 370.0 |
| 78 | 700 | 371.1 |
| 79 | 701 | 371.7 |
| 80 | 703 | 372.8 |
| 81 | 704 | 373.3 |
| 82 | 706 | 374.4 |
| 83 | 707 | 375.0 |
| 84 | 709 | 376.1 |
| 85 | 710 | 376.7 |
| 86 | 713 | 378.3 |
| 87 | 714 | 378.9 |
| 88 | 715 | 379.4 |
| 89 | 716 | 380.0 |
| 90 | 717 | 380.6 |
| 91 | 720 | 382.2 |
| 92 | 722 | 383.3 |
| 93 | 725 | 385.0 |
| 94 | 727 | 386.1 |
| 95 | 731 | 388.3 |
| 96 | 734 | 390.0 |
| 97 | 737 | 391.7 |
| 98 | 743 | 395.0 |
| 99 | 751 | 399.4 |
| 100 | 761 | 405.0 |

In another aspect, the present disclosure provides a method of using the composition for suppressing particles described herein. The method using the composition comprises applying the composition to bring the composition in contact with the particles. The step of applying the composition may comprise a step of mixing the composition with the particles, or a step of spraying the composition onto with the particles, or any combinations thereof. The composition is sprayed into drops having any suitable size. When the size of the drops is substantially similar or close to (or the same as) the size of the particles, the drops can be better combined with the particles in some embodiments. For example, if the particles contain silica in the ranges of from 180 microns to 389 microns, the drop size can be in the range such as from 236 microns to 340 microns.

The method of using can further comprise heating the composition before or during the step of applying the composition, at a suitable temperature according to its melting point. The temperature can be in the range from about 10° C. to about 100° C. (e.g., from about 37° C. to about 70° C. or from about 20° C. to about 25° C., or from about 20° C. to about 37° C.).

Figure 4A:
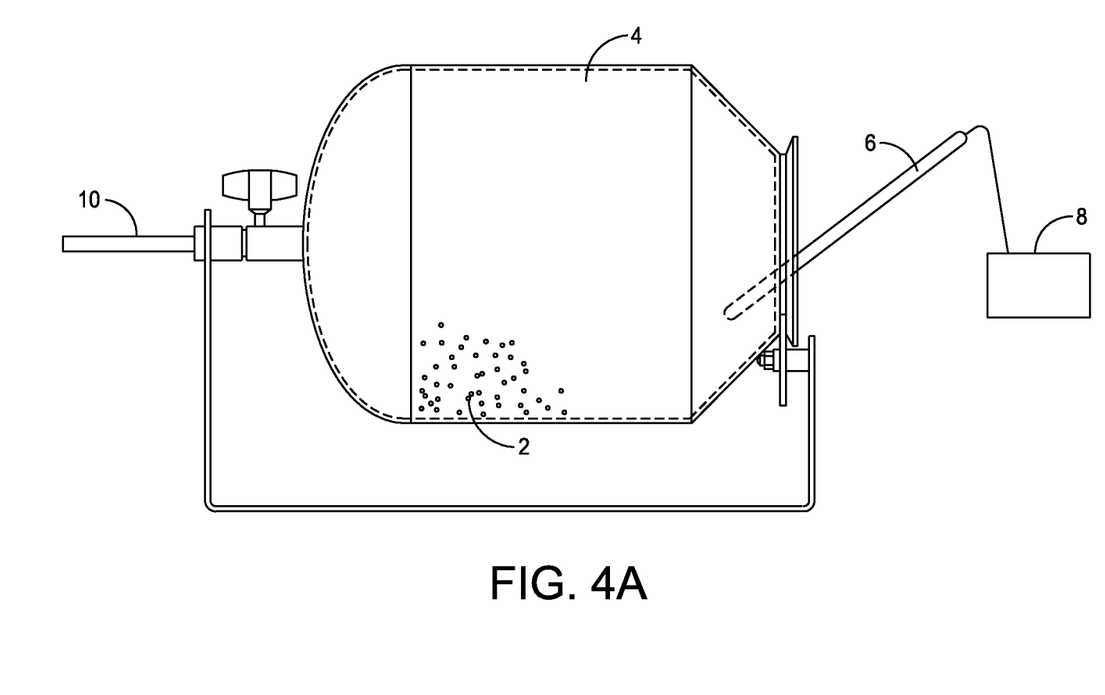
FIGS. 4A-4C illustrate the apparatus for testing dust suppression used in some embodiments.
Figure 4B:
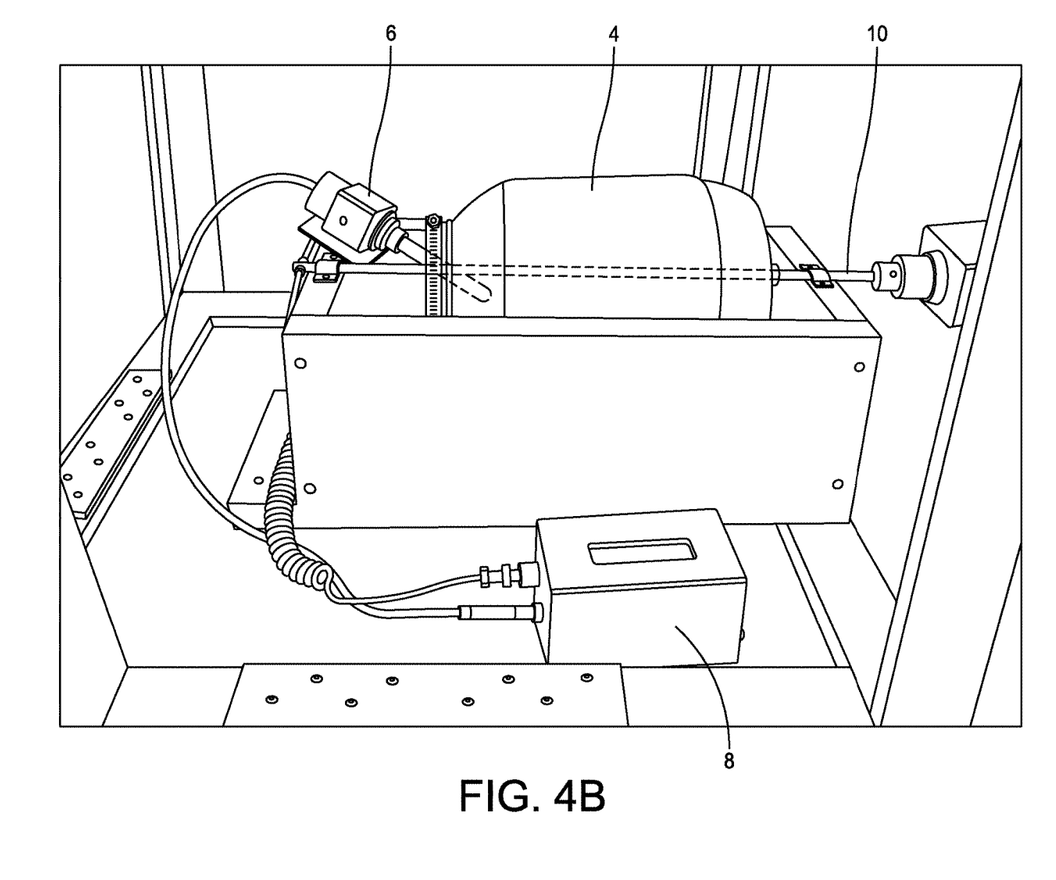
Figure 4C:
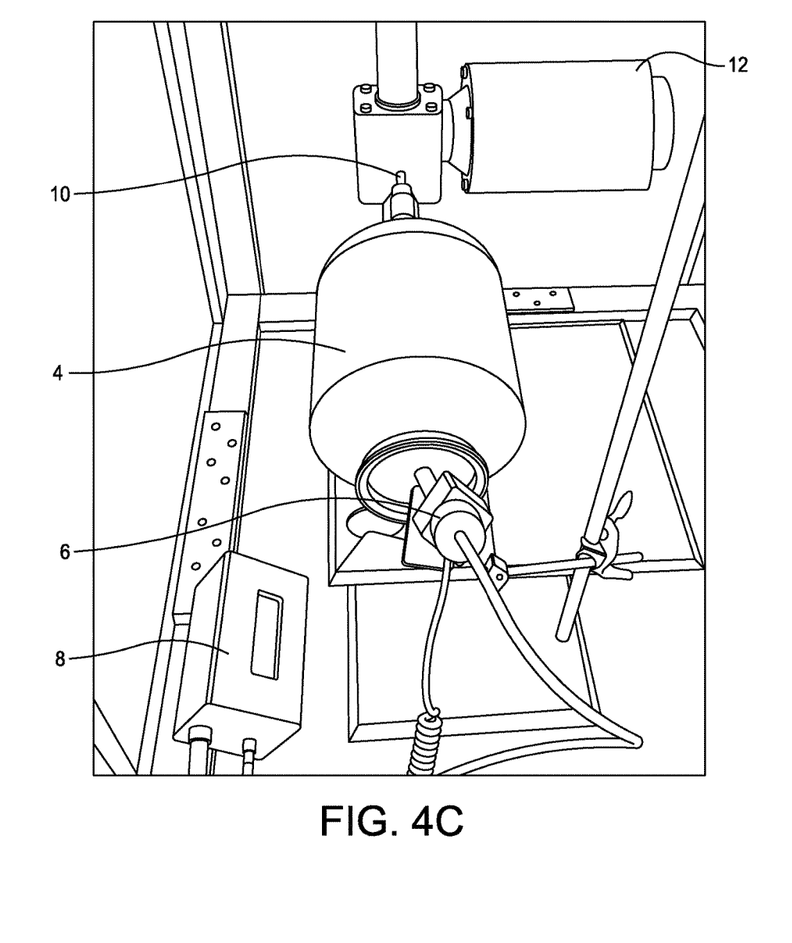

Hydrogenated Waxy LLN, as an exemplary composition, can be directly used as a dust suppressant. It can be mixed and coated onto the particles or sprayed onto the particles. In some embodiments, hydrogenated Waxy LLN is heated at a temperature (e.g., about 21° C. or 37.7° C.) during the process of applying. Referring to FIGS. 4A-4C, an exemplary apparatus as shown is used for testing dust suppression in some embodiments. Typical testing results of hydrogenated Waxy LLN are shown in Table 5.

A testing procedure is used to simulate the application site. Referring to FIGS. 4A-4C, 300 g of particles (2) such as sand is placed into a container (4), which can be made of plastic or metal. One end of the container (4) is open to air and provides a partially enclosed structure. About 0.1 wt. % (about 15 drops) of a composition such as hydrogenated Waxy LLN is mixed with the particles. A Haz-Dust Dust monitor (6) is placed inside the container (4) close to the open end. The container (4) is rotated constantly at a suitable rate, through a shaft (10) connected with a motor (12). The data of particles in the atmosphere inside the container (4) is collected by the Haz-Dust Dust monitor (6) connected with a recorder (8) in the partially enclosed structure with the analyzer placed 13 inches from the mouth of the container (4). The inventors have determined this test replicates the exposure a worker in the field would have on an active frac site. Respirable particles such as respirable silica can be also introduced into the container. The data in Table 5 are time weighted averages for an 8 hour shift.

Different particles were used. Sargent 40/70 is an API approved frac sand having a size in the range of from 40 mesh to 70 mesh available from SARGENT Sand Company of Saginaw, Mich. UNIFRAC® 30/50 is a hydraulic fracturing sand having a size in the range of from 30 mesh to 50 mesh available from Unimin Corporation—Energy Division of the Woodlands, Tex. US SILICA™ 100 mesh is a silica product having an average size of about 100 mesh available from U.S. Silica Corporation of Frederick, Md.

Referring to Table 5, hydrogenated Waxy LLN provides excellent performance in suppressing dust particles. For example, the dust density is reduced to below the proposed OSHA PEL for the 40/70 and 30/50 material.

TABLE 5

Hydrogenated Waxy LLN as Dust Suppressant

| Particle Type | Dust Density with No Treatment ($\mu g/m^3$) | Dust Density After Treatment with Inventive Composition ($\mu g/m^3$) | Dust Reduction Percentage |
|---|---|---|---|
| Sargent 40/70 mesh | 1,310 | <50 | >96.18% |
| UNIFRAC ® 30/50 mesh | 1,240 | <50 | >95.97% |
| US SILICA ™ 100 mesh | 4,360 | 70 | 98.39% |

Referring to Table 6, different initial fractions were evaluated, and compared to Waxy LLN and hydrogenated Waxy LLN. Nonwaxy LLN is derived from Waxy LLN, but the wax therein has been removed. The Medium Neutral (MN) grade and the Heavy Neutral (HN) grade have boiling points higher than that of Waxy LLN. Referring to Table 6, the portion having a boiling point above 376° C. is used as an indication of the wax content. Nonwaxy LLN, the Medium Neutral (MN) grade and the Heavy Neutral (HN) grade did not provide desirable results for suppressing dust particles. Based on the results, suitable wax content plays an important role in dust suppression. The content of the wax may not be less than 5%, or higher than 80%. The wax content can be in the range from about 5% to about 40% (e.g., 5-30, or 10-20%) by weight of the total composition.

TABLE 6

Comparison of Different Fractions

| Oil Type | Boiling Point Range (° C.) | Boiling Point at the Peak (° C.) | Wt. % for Boiling Point >376° C. |
|---|---|---|---|
| Nonwaxy LLN | 286-400 | 353 | ≤5% |
| Waxy LLN | 300-400 | 356 | 11% |

TABLE 6-continued

Comparison of Different Fractions

| Oil Type | Boiling Point Range (° C.) | Boiling Point at the Peak (° C.) | Wt. % for Boiling Point >376° C. |
|---|---|---|---|
| Waxy LLN (after hydrogenation) | 285-405 | 356 | 16% |
| Medium Neutral (MN) Grade | 300-528 | 424 | 85% |
| Heavy Neutral (HN) Grade | 342-657 | 520 | 99% |

Although the subject matter has been described in terms of exemplary embodiments, it is not limited thereto. Rather, the appended claims should be construed broadly, to include other variants and embodiments, which may be made by those skilled in the art.

What is claimed is:

1. A composition for suppressing dust particles, comprising:
   from about 51% to 95% by weight of saturated hydrocarbons; and
   from 5% to about 49% by weight of unsaturated hydrocarbons;
   wherein the composition has a content of wax in the range from about 10% to about 20% by weight of the total composition, and the wax is saturated hydrocarbon.

2. The composition of claim 1, wherein
   the saturated hydrocarbons and the unsaturated hydrocarbons are hydrocarbons in the range of from C6 to C61.

3. The composition of claim 1, wherein
   the saturated hydrocarbons comprise hydrocarbons substantially in the range of from C16 to C26.

4. The composition of claim 1, wherein
   the wax is paraffinic wax.

5. The composition of claim 1, wherein
   the wax is saturated hydrocarbon in the range from C27 to C61.

6. The composition of claim 1, wherein
   the wax has a boiling point of equal to or higher than 376° C. measured under atmospheric pressure.

7. The composition of claim 1, wherein
   the saturated hydrocarbons and the unsaturated hydrocarbons have a boiling point in the range from about 285° C. to about 405° C., and from about 60% to about 95% by weight of total composition has a boiling point of in the range of from 285° C. to 376° C., the boiling points being measured under atmospheric pressure.

8. The composition of claim 1, wherein
   the saturated hydrocarbons further comprises at least one cyclic saturated hydrocarbon, and the at least one cyclic saturated hydrocarbon is in the range from about 0.1% to about 10% by weight of the total composition.

9. The composition of claim 8, wherein
   the saturated hydrocarbons comprise paraffin in the range of from about 61% to about 95% by weight of the total composition.

10. The composition of claim 1, wherein the composition has a melting point of in the range of from 0° C. to 37.7° C.

11. The composition of claim 1, wherein the unsaturated hydrocarbons are in the range of from about 5% to about 30% by weight of the total composition.

12. The composition of claim 1, wherein the unsaturated hydrocarbons are in the range of from about 10 to about 20% by weight of the total composition.

13. The composition of claim 1, wherein the unsaturated hydrocarbons are aromatic.

14. A method of making the composition of claim 1 for suppressing dust particles, comprising:
   fractionally distilling a fraction from a crude oil, the fraction comprising saturated and unsaturated hydrocarbons in the range of from C6 to C61.

15. The method of claim 14, further comprising:
   hydrogenating the fraction to convert at least a portion of the unsaturated hydrocarbons to saturated hydrocarbons.

16. The method of claim 15, wherein
   the unsaturated hydrocarbons in the fraction comprise aromatic hydrocarbons, and at least a portion of the aromatic hydrocarbons is converted into cyclic saturated hydrocarbons after the step of hydrogenating.

17. The method of claim 15, wherein
   the unsaturated hydrocarbons in the fraction comprise less than 5% by weight of olefin, and the olefin is converted into saturated hydrocarbon after the step of hydrogenating.

18. The method of claim 15, wherein a degree of the hydrogenation in the step of hydrogenating is in the range from 10% to 95% by weight of the unsaturated hydrocarbons in the fractions.

19. A method of using the composition of claim 1 for suppressing particles, comprising:
   applying the composition to bring the composition in contact with the particles.

20. The method of claim 19, wherein
   the step of applying the composition comprises a step of spraying the composition onto with the particles.

21. The method of claim 20, wherein the composition is sprayed into drops having a size substantially similar or close to the size of the particles.

22. The method of claim 19, further comprising:
   heating the composition before or during the step of applying the composition.

23. The method of claim 22, wherein the composition is heated at a temperature of in the range from 20° C. to 100° C.

24. A composition for suppressing dust particles, comprising:
   from about 80% to 95% by weight of saturated hydrocarbons; and
   from 5% to about 20% by weight of unsaturated hydrocarbons, the unsaturated hydrocarbon being aromatic;
   wherein the composition has a content of wax in the range from about 10% to about 20% by weight of the total composition, and the wax is saturated hydrocarbon.

25. The composition of claim 24, wherein
   the saturated hydrocarbons and the unsaturated hydrocarbons are hydrocarbons in the range of from C6 to C61.

26. The composition of claim 24, wherein
   the wax is saturated hydrocarbon in the range from C27 to C61.

* * * * *